United States Patent [19]

Yamanaka

[11] Patent Number: 4,816,988
[45] Date of Patent: Mar. 28, 1989

[54] MASTER STATION APPARATUS IN SUPERVISORY AND CONTROL SYSTEM

[75] Inventor: Torao Yamanaka, Nishinomiya, Japan

[73] Assignee: Mitsubishi Denki Kabushiki Kaisha, Tokyo, Japan

[21] Appl. No.: 404,913

[22] Filed: Aug. 3, 1982

[30] Foreign Application Priority Data

Aug. 31, 1981 [JP] Japan .................................. 56-137321

[51] Int. Cl.[4] .............................................. G09G 3/02
[52] U.S. Cl. .................................... 364/188; 364/138; 235/375
[58] Field of Search ......................... 364/188, 189, 138; 340/710, 711, 712; 360/2; 235/375, 449

[56] References Cited

U.S. PATENT DOCUMENTS

| | | | |
|---|---|---|---|
| 3,387,084 | 6/1968 | Hine et al. | 340/705 |
| 3,422,418 | 1/1969 | Simoneau | 340/722 |
| 3,555,516 | 1/1971 | Proctor | 364/138 |
| 3,757,037 | 9/1973 | Bialek | 340/712 |
| 4,001,807 | 1/1977 | Dallimonti | 340/711 |
| 4,028,695 | 6/1977 | Saich | 340/711 |
| 4,251,858 | 2/1981 | Coombigue et al. | 364/189 |
| 4,303,973 | 12/1981 | Williamson, Jr. et al. | 364/189 |
| 4,396,977 | 8/1983 | Slater et al. | 364/188 |
| 4,451,895 | 5/1984 | Sliwkowski | 364/188 |

OTHER PUBLICATIONS

"SCADA: Where are we? Where are we going?", John T. Tyner, Transmission & Distribution, pp. 23–56, May 1980.

Primary Examiner—John R. Lastova
Attorney, Agent, or Firm—Lowe, Price, LeBlanc, Becker & Shur

[57] ABSTRACT

A master station in a supervisory control system comprises a console (3) having a card reader (5) and control switches (9, 11, 13), a card (7) being inserted into the card reader. Information specifying a substation (271–27n) and a device (D11–Dnm) included in the substation is recorded in machine and human readable form on the card. A signal from the card reader is applied to an output control (23) through an input control (17), the output control reading the contents of a status memory (21) and a pattern memory (25) associated with the substation and device specified by the card, and providing a pattern display on a video display (1) based on the read information. The display of the selected device is flashed on the video display. An operator's actuation of the control switch causes the input control to send the control command to a line interface (19), and the line interface transmits the control command to a substation containing the selected device.

8 Claims, 6 Drawing Sheets

FIG. I  PRIOR ART
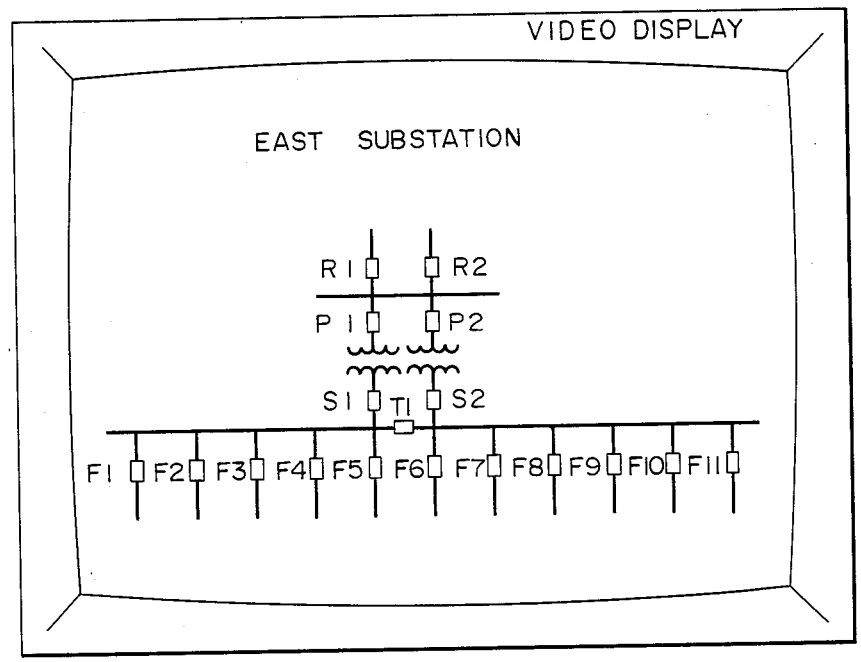
FIG. 2  PRIOR ART
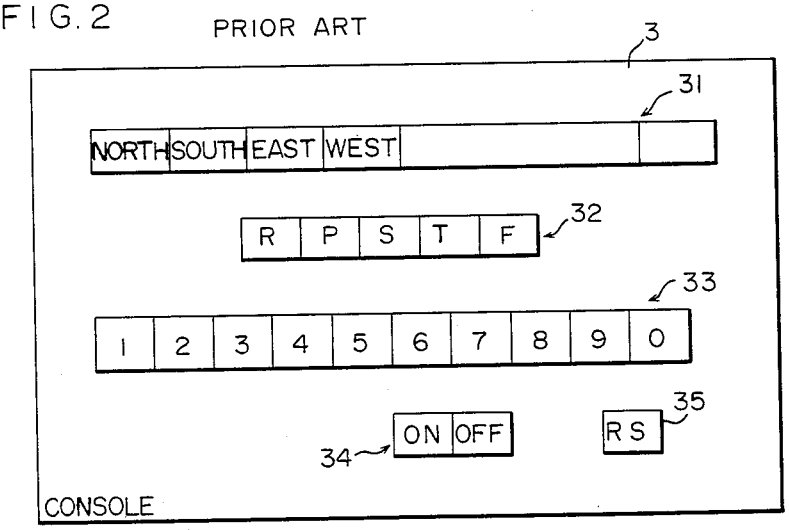

MASTER STATION APPARATUS IN SUPERVISORY AND CONTROL SYSTEM

BACKGROUND OF THE INVENTION

1. Field of the Invention

The present invention relates to a master station apparatus in a supervisory and control system. More particularly, the present invention relates to a master station apparatus for remotely supervising the status of devices to be controlled included in each of several substations, such as a power plant, a substation and the like, in a power system, for example, and for remotely controlling the selected device as necessary.

2. Description of the Prior Art

A master station apparatus in a supervisory and control system comprises a supervisory panel for always and remotely supervising status of devices included in a substation and a control panel for selectively and remotely controlling any of these devices, for example, in an on or off manner. Conventionally, it is usual that such an optimum supervisory panel and control panel for the master station apparatus is manufactured for each system according to the kind and the size of the system to be supervised and controlled. Recently, as a general-purpose video display apparatus using a cathode-ray tube has been put into practice, the supervisory panel has been able to be structured by using a fixed hardware structure common to any system. More particularly, recently, an indication has come to be made in a free and optimum fashion according to a type and/or a size of the system, using a general-purpose video display 1 as shown in FIG. 1. However, most of control panels or consoles are of a type made on order for each system, as conventional.

FIG. 2 is a diagrammatic view showing an example of a conventional console which is a background of the present invention. The conventional control panel or console 3 comprises a substation selecting switch 31, a device selecting switch 32, a number switch 33, a control switch 34 and a reset switch 35. The substation selecting switch 31 includes a plurality of switches corresponding to the respective substations, indicating the names of the substations, respectively, such as north, south, east, west and the like. For example, if the switch "EAST" is depressed, the east substation as shown in FIG. 1 is selected. The device selecting switch 32 includes a plurality of switches for selecting devices, for example, receiving power:R, primary:P, secondary:S, bus tie:T and feeder:F. The number switch 33 includes ten key switches of from "0" to "9" and is used for designating a device number. For example, if the F key included in the device selecting switch 32 is depressed and then the key indicating the numeral 7 included in the number switch 33 is actuated, the seventh feeder, that is, F7, indicated in a skeleton diagram as shown in FIG. 1 is designated. After such selection of a device the feeder F7 is remotely controlled and is rendered ON by depressing the ON switch in the switch 34.

As described in the foregoing, since a substation selecting switch 31 and a device selecting switch 32 are provided in the conventional console, it has been necessary to alter the contents and the number of these selecting switches according to the change of a system structure. Accordingly, it is difficult to utilize such console commonly to any supervisory and control system, without changing the hardware structure. As a result, it is necessary to manufacture individually an optimum console for each system and thus an increase of the cost cannot be avoided.

Over against this, it can be considered that alphameric keys are provided in a console and any substation and any device can be selected by such key operation, so that a general-purpose console may be obtained. However, in such a console designating a substation and a device number by a combination of such alphameric keys, a further problem will be encountered. More particularly, in order to designate a specific device in a specific substation by selectively operating a number of alphameric keys, such an operation takes many steps and thus becomes troublesome. In addition, there is danger that a serious accident will arise in a whole system. More specifically, although an accident may arise when a selection of an erroneous device is made and an erroneous control is made to the erroneously selected device, a possibility of causing such an erroneous operation becomes extremely high in such selectively combined operations of the alphameric keys. It comes to be contrary to the basic requirement of such kind of console which main object is to prevent erroneous selection of a device and erroneous control and thus is not preferred. In the case where a breaker and a disconnecting switch in a certain substation of a power system, for example, are checked, it is necessary to make a lock for security in order to disable the operation of the device. However, in a console containing the above described alphameric keys, there is a problem that it is difficult to confirm, with ease, the operation of such lock for security and the result of the operation.

Meanwhile, one example of a supervisory and control system structuring a supervisory panel using a general-purpose video display apparatus as shown in FIG. 1 is represented by the book entitled "Transmission & Distribution" by John T. Tyner, pages 23 to 56, published May, 1980, for example.

SUMMARY OF THE INVENTION

Accordingly, a principal object of the present invention is to provide a master station apparatus in a supervisory and control system, both a supervisory panel and control panel thereof being structured by a fixed hardware, which is easy in operation thereof and hardly has possibilities causing an erroneous selection or erroneous control and thus is safe.

A master station in accordance with the present invention utilizes a card for designating a device to be controlled. A device specifying information for specifying a device to be controlled is visually and mechanically readably recorded in the card. A console comprises a card reader receiving the card and reading out the device specifying information recorded in the card, and control and operating means for remotely controlling the device selected by the card. A status memory is provided for storing the newest status of the device. A pattern memory is preferably provided for storing a pattern, such as a skeleton diagram, of a system associated with the device. The corresponding contents of the status memory and the pattern memory are read out based on the specifying information read from the card and indicated on a video display. If and when an operator operates the control and operating means, then a control command is sent to the device being selected.

In accordance with a preferred embodiment of the present invention, in a case where the status and/or a pattern of the device is displayed on a video display, the representation of the device, for example, is indicated in a manner different from the remaining portions. To this end, a display signal for flash display, for example, is applied to the video display in association with the device selected together with the contents of the pattern memory. In accordance with this preferred embodiment, it is easy to confirm whether the selection of a device is correct or not.

The present invention is utilized as a master station apparatus for controlling in a generalized manner a system having a plurality of substations, such as a power system, for example. Each the substations comprises a plurality of devices to be controlled, for example, breakers and disconnecting switches and the like. A pattern such as a skeleton diagram for each substation is fixedly stored in the pattern memory. From each substation to the status memory is applied information indicating a status of each device included in the substation, for example, an open circuit state or a closed circuit state and in this way, the status memory is usually refreshed and stores the newest status of each device. The specifying information recorded in the card for use in a master station in such a system includes the names of substations and devices. A substation pattern selected by a card is read out from the pattern memory and is displayed on a video display. What the status of the selected device included in the pattern is now is indicated by signs or characters.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a drawing showing an embodiment of a pattern indication using a video display which is a background of the present invention;

FIG. 2 is a drawing showing an example of a conventional console;

DETAILED DESCRIPTION OF THE PREFERRED EMBODIMENTS

Figure 3:
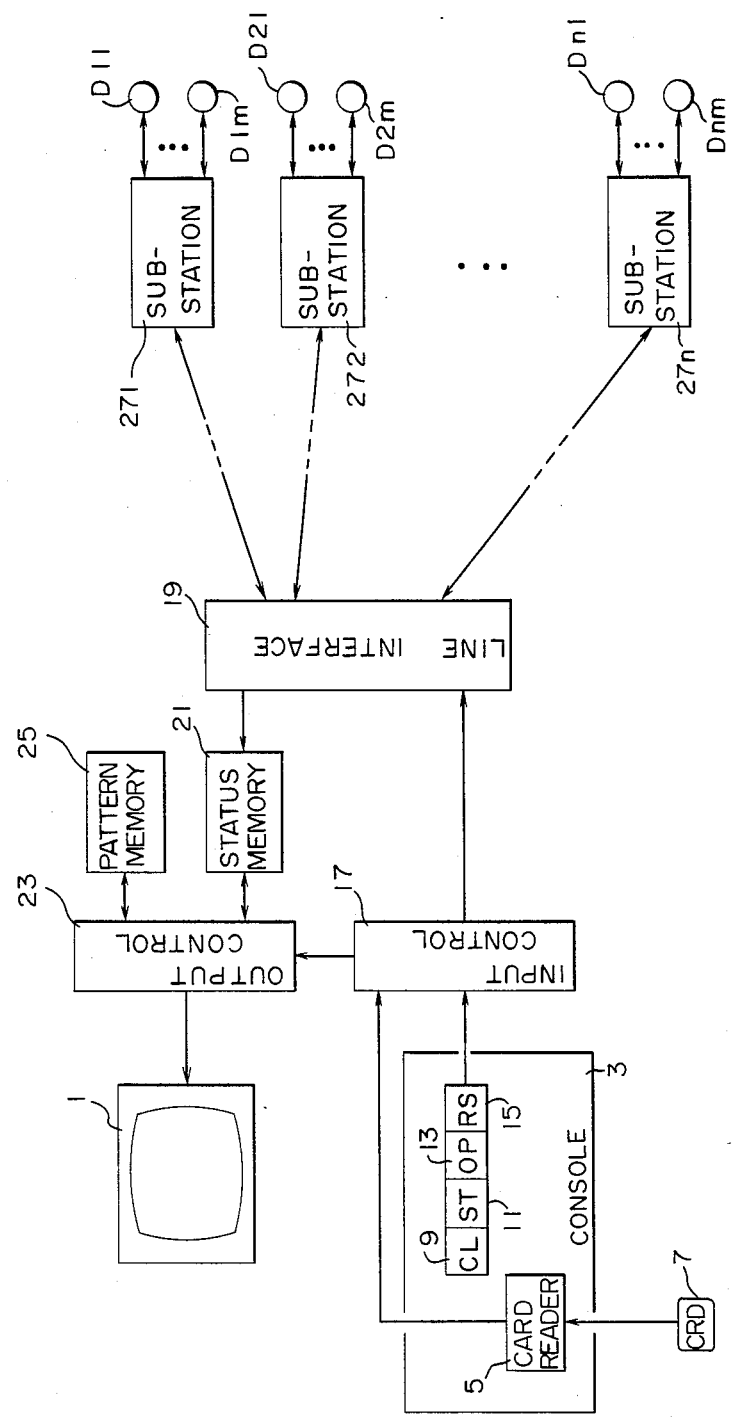
FIG. 3 is a block diagram showing an embodiment of the present invention.

FIG. 3 is a block diagram showing an embodiment of the present invention. A console 3 comprises a card reader 5 which is provided with a card insertion port (not shown) for receiving a card 7. The console 3 further comprises operation switches, 9, 11, 13 and 15. The switch 9 is a CL switch for closing a device to be controlled. The switch 11 is an ST switch for stopping an operation of a device to be controlled. The switch 13 is an OP switch for opening a device to be controlled, and the switch 15 is an RS switch for returning the card reader 5 and an input control 17 to an initial state.

Figure 6:
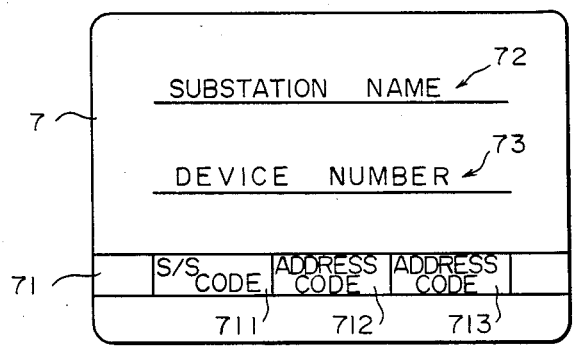
FIG. 6 is a diagram showing an example of a record format of a card which can be utilized in the present invention.

Visible information and mechanically readable information are recorded in the card 7 in a format as shown in FIG. 6. The card 7 is formed with a magnetic strip 71, the magnetic strip 71 comprising a substation code area 711 and address code areas 712, 713. A number specifying any one of substations 271 to 27n as shown in FIG. 3 is recorded in the substation code area 711, and a code specifying numbers 1 to m of devices D to be controlled included in the substation is recorded in the address code areas 712 and 713. A numeral of the digit of 10 of a device number is recorded in the address code area 712 and a numeral of the digit of 1 of a device number is recorded in an address code area 713. The card 7 is further formed with visible information areas 72 and 73, the name of the substation and a device number being indicated in the areas 72 and 73 in a manner that an operator can read them. In such a way, the card 7 is prepared for each of m devices included respectively in the substations 271 to 27n as shown in FIG. 3. For example, in a card for a device Dnm included in the substation 27n as shown in FIG. 3, "27n" is recorded in the substation code area 711 and "n" and "m" are recorded in the address code areas 712 and 713, respectively. If the substation 27n is an east substation, for example, the indication "east substation" is displayed in the area 72 and, if the device Dnm is the tenth feeder, for example, the indication "F10" is displayed in the area 73.

Figure 4:
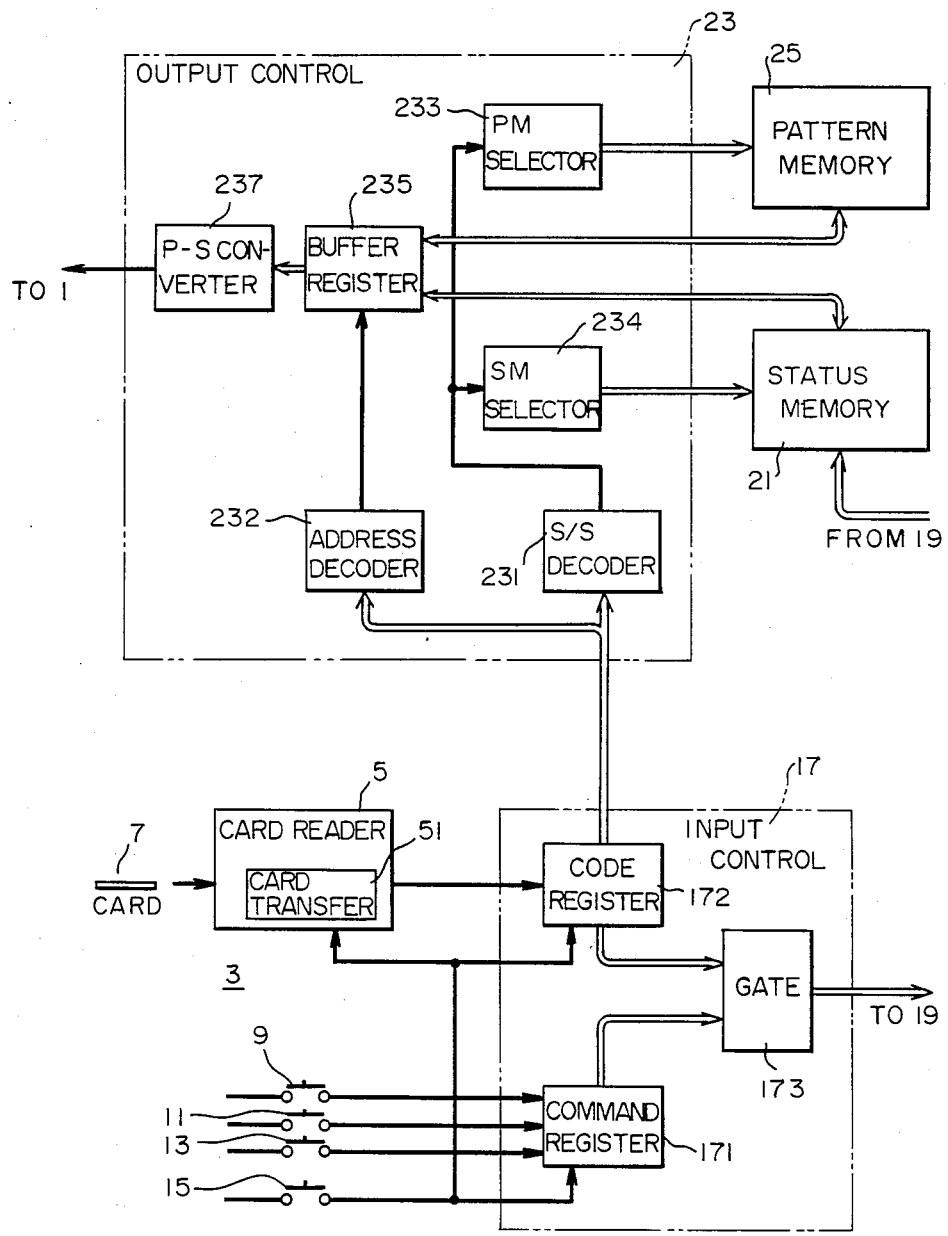
FIG. 4 is a block diagram showing a detailed input control and output control included in the FIG. 3 embodiment.

Referring to FIG. 4, a signal from the console 3 is applied to an input control 17. More particularly, the data from the card reader 5 is applied to a code register 172 included in the input control 17. Accordingly, a substation code and an address code read out from the card 7 by the card reader 5 are loaded into the register 172. The card reader 5 contains a card transfer mechanism 51 for moving the inserted card into a predetermined position for reading or returning out the card from the position. The card transfer mechanism 51 includes a motor (not shown). Signals from the CL switch 9, ST switch 11 and OP switch 13 are stored in a command register 171 included in the input control 17. The RS switch 15 provides a reset signal to the card reader 5, the command register 171 and the code register 172. The substation code and the address code loaded in the register 172 are applied to the line interface 19 through a gate 173. Similarly, a command loaded in the register 171 is applied to the line interface 19 through the gate 173. The contents in the register 172 are further applied to a substation decoder 231 and an address decoder 232 included in the output control 23. The substation decoder 231 decodes a substation code and provides to a PM selector 233 and an SM selector 234 a signal indicating which substation should be selected. The address decoder 232 decodes an address code and provides to a buffer register 235 a signal indicating which device should be selected. The buffer register 235 is coupled to a pattern memory (PM) 25 and a status memory (SM) 21. The pattern memory 25 comprises, for example, a magnetic disc or a read only memory and the like, and stores a "pattern" of a system, such as a skeleton diagram as shown in FIG. 1, for example, for each of the substations 271 to 27n. The status memory 21 comprises, for example, a random access memory and stores the status of all the devices included in the substations 271 to 27n. The refreshing of the status memory 21 is performed by scanning the status of each device at an interval of a predetermined time period and altering the status of the device which caused a change of the status. To this end, the status memory 21 is coupled to the line interface 19. The contents associated with the device selected from the status memory 21 and the pattern memory 25 are loaded into the buffer register 235. The content of the buffer register 235 is applied to the P-S converter 236. The P-S converter 236 is of an apparatus for converting the content of the buffer register 235 into a bit serial signal and transmitting the bit serial signal to a video display 1, in order to reduce the number of cores of a connecting cable between the output control 23 and the video display 1.

Figure 5:
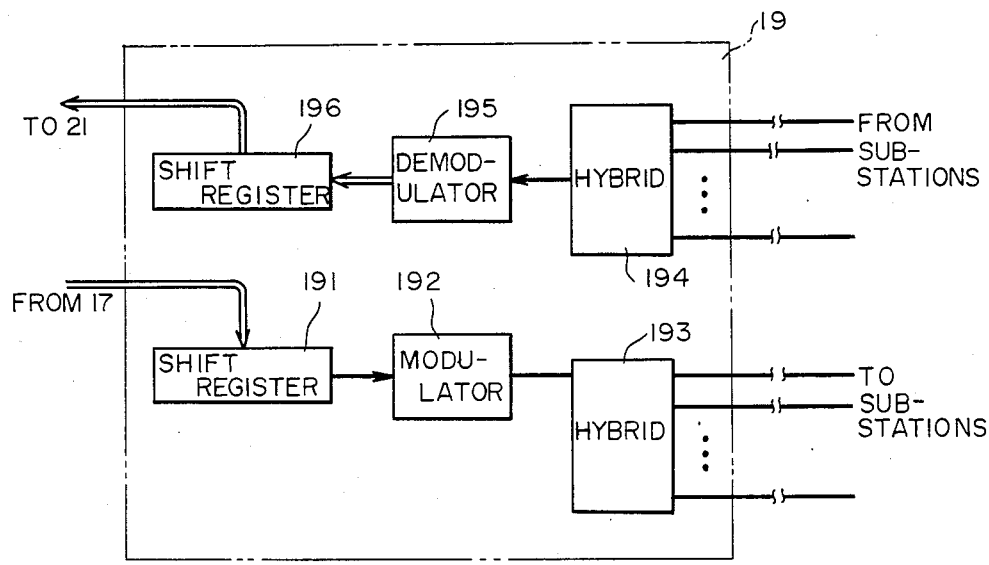
FIG. 5 is a block diagram showing a detailed line interface included in the FIG. 3 embodiment.

The line interface 19 comprises a shift register 191 as shown in FIG. 5, which receives a signal from gate 173 (FIG. 4) in the input control 17. The content of the shift register 191 is modulated by a modulator 192 in accordance with a conventional appropriate modulation method and transmitted through a hybrid circuit 193 to the respective substations. Status signal and the like from the respective substations are transmitted to a hybrid circuit 194 included in the line buffer 19. The hybrid circuit 194 provides a signal from the substation to a demodulator 195. The demodulator 195 demodulates the status signal from the substation and provides the demodulated signal as a digital signal to the shift register 196. The content of the shift register 196 is applied to the status memory 21.

With the above described structure, a series of manipulations or operations of the FIG. 3 embodiment will be described in the following. Each of the substations 271 to 27n usually supervises the status of m devices D11 to D1m, D21 to D2m . . . Dn1 to Dnm to be controlled which are included in the substation, and provides a signal indicating the status at that time through a transmission line to the line interface 19 included in a master station. In the line interface 19, an applied status signal is demodulated and loaded into the shift register 196. Therefore, an area corresponding to each device in the status memory 21 is refreshed by the content of the shift register 196. In such a way, the status memory 21 always stores the most recent status of the device. Such refreshing of the status memory 21 is performed at an interval of a predetermined time.

In case where an operator wishes to select and control some device included in a certain substation, the operator selects a card 7 from a number of cards by observing the name of the substation and a device number indicated in the visible indicating areas 72 and 73. The selected card 7 is inserted into a card insertion port of the card reader 5 included in the console 3. Correspondingly, the card reader 5 reads out a substation code and an address code recorded in the substation code area 711 and the address code areas 712 and 713 of the card 7. The read out code is loaded into the code register 172 of the input control 17 and then is applied from code register 172 to the decoders 231 and 232 included in the output control 23. In the output control 23, the decoder 231 decodes the applied substation code and outputs to the PM selector 233 and SM selector 234 a signal indicating which substation should be selected. The PM selector 233 reads a corresponding substation pattern included in the pattern memory 25 and the pattern information from the memory 25 is applied to the buffer register 235. The SM selector 234 reads out the information data of each device of the corresponding substation from the status memory 21 and the status information from the memory 21 is applied to the buffer register 235. The buffer register 235 combines the applied pattern information and the status information. The combined pattern information and status information are sent from the buffer register 235 to the P-S converter 236. At that time, the signal indicating a device to be selected has been applied to the buffer register 235 from the address decoder 232. Therefore, regarding the device corresponding to the applied address, a display control signal is simultaneously sent to the converter 236 from the buffer register 235 so that the symbol for the device is displayed in a manner different from other devices, for example, in a flash display manner. Thus, a known type of display signal is applied to a video display 1 from the P-S converter 236.

A pattern as shown in FIG. 1, for example, is displayed on the video display 1 responsive to an applied display signal. Assuming that a substation is a substation in a power system as an example, a skeleton diagram such as in FIG. 1 is displayed and at the same time an open or closed state of each device is displayed. For example, in case where the device is in a open state, the symbol of the device is displayed in green, and in case where the device is in a closed state, the symbol of the device is displayed in red, and the symbol of the device selected by the card is slowly flashed. As a result, the operator can easily confirm whether his selection is correct or not. In order to identify the selected device, another displaying manner, such as a highlighted display may be employed instead of the above described flashed display.

In the above described embodiment, the display for confirming the selection of a device through an operator's selection of a card was performed within a master station based only on information from the card. However, such display for confirmation of the selection may be of a type that a selected device is displayed in a master station after the master station receives a confirmation signal from a substation, that is, after the substation confirms the selection. More particularly, if and when a certain device in a certain substations is selected by insertion of a card 7, the selection signal is sent to the line interface 19 through a gate 173 and the line interface 19 sends the selection signal to a corresponding substation. Then, in the substation, it is confirmed that the device selected by the operator is included in the substation and the confirmation signal is returned back to the line interface 19. The master station provides the confirmation signal from the substation to the buffer register 235, for example, so that the above described flashed display or highlighted display is performed.

The operator confirms his selected device through a video display on which the above described manner is displayed. Then, any of switches 9, 11, and 13 for control necessary for the corresponding device is depressed. As a result, a signal from the depressed switch is applied to the command register 171 included in the input control 17 and a control signal corresponding to the switch, together with the contents of the code register 172 is applied from the command register 171 to the line interface 19 through a gate 173. The line interface 19 sends an address code and a command signal to the substation specified by an applied substation code. In any one of the substations 271 to 27n, an error check of a signal sent from the line interface 19, that is, a master station, is made and the signal is decoded. The substation sends a control signal commanded by the control switches 9, 11 or 13 to the device designated by the address code, based on the result of the decode.

In the substation, after the corresponding device performs a predetermined operation according to the content of the applied control signal, the change of the status of the device is sent to the master station, that is, the line interface 19. In the line interface 19, the corresponding content in the status memory 21 is altered based on the change of status signal sent. The altered content is applied to the buffer register 235 from the status memory 21. For this reason, the change of indication on the video display 1 is caused. For example, assuming that the selected device is in a closed state and the control content which an operator provides is of a content that the device is made to be an open circuit, an indication of the corresponding device on the video display 1 changes, for example, from green to red.

Thus, the operator recognizes that his selected device performs a predetermined operation based on a control commanded by him, through an indication on the video display 1 and thereafter, depresses the RS switch 15. Upon depression of the switch 15, the card reader 5 returns the inserted card from the card insertion port. More particularly, a signal from the RS switch 15 is applied as a reverse command of a motor (not shown) included in the card transfer mechanism 51, so that the card transfer mechanism 51 returns the card out to the card insertion port (not shown). At the same time, the two registers 171 and 172 included in the input control 17 are both returned to the initial state by clearing the contents therein. As a result, there are no inputs to be applied to two decoders 231 and 232 included in the output control 23 and thus indication on the video display 1 is erased.

The CL switch 9 and OP switch 13 are employed for closing or opening, for example, breakers and disconnecting switches. The ST switch 11 is utilized for stopping an operation of a voltage regulator or an operation of an valve, for example, in case where a voltage of the voltage regulator is increased or decreased, or in case where the valve is opened or closed. In case where a voltage of a voltage regulator is adjusted using the ST switch 11, the value of the voltage of the voltage regulator is transmitted from the substation to a master station apparatus. In the master station apparatus, the voltage value is displayed on the video display 1 and an operator stops the change of voltage of the voltage regulator by operating the ST switch 11 in an appropriate timing while observing the displayed voltage value. An opening degree of the valve can also be displayed on the video display 1.

In the FIG. 3 embodiment, a master station apparatus is structured by blocks of discrete circuits. However, it is possible to structure the present invention using a central processing unit such as a microprocessor or a microcomputer.

Figure 7:
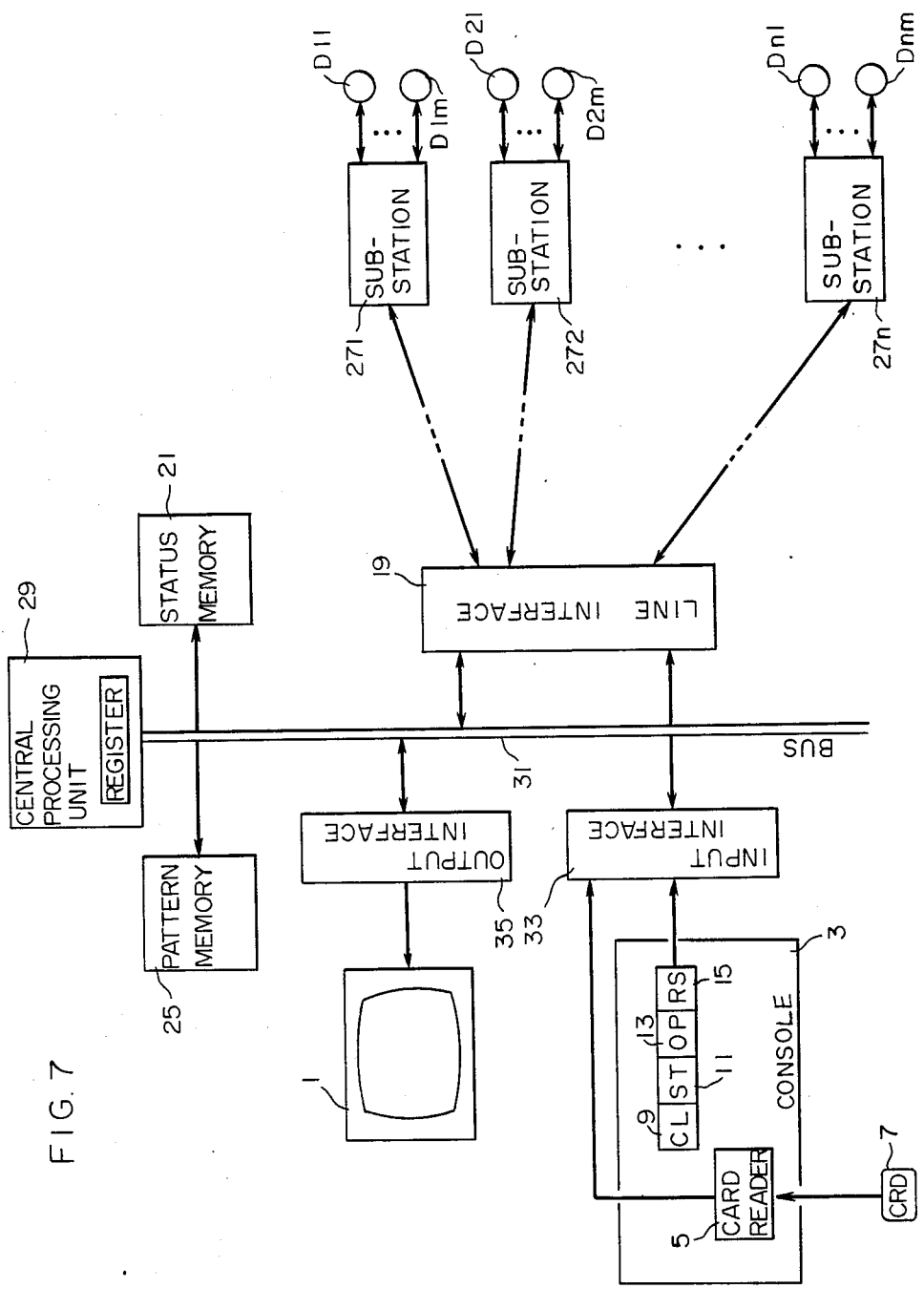
FIG. 7 is a block diagram showing another embodiment of the present invention using a central processing unit.

FIG. 7 is a block diagram showing another embodiment of the present invention. The FIG. 7 embodiment comprises a central processing unit 29 in a master station apparatus. As the central processing unit 29, an appropriate known microprocessor or a microcomputer may be utilized. The central processing unit 29 is coupled to a bus 31. To the bus 31 are connected a line interface 19, a status memory 21 and a pattern memory 25. An input interface 33 is interposed between the bus 31 and the console 3 and an output interface 35 is interposed between a video display 1 and the bus 31. The central processing unit 29 comprises a memory or a register necessary for data processing.

Figure 8:
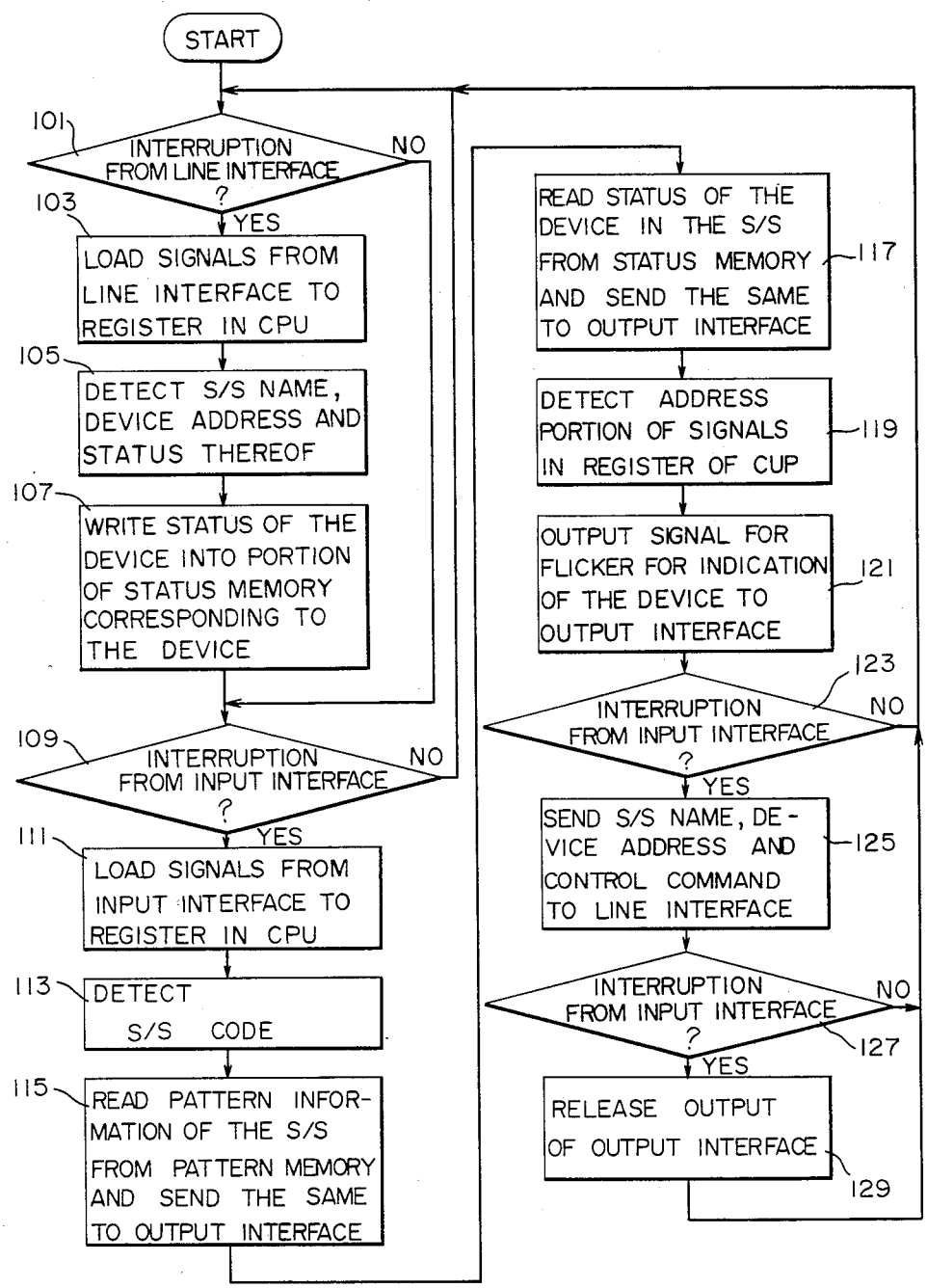
FIG. 8 is a system flow chart of the central processing unit of the FIG. 7 embodiment.

Referring to FIG. 8, operation of the central processing unit 29 in the FIG. 7 embodiment will be described. The central processing unit 29 is in a stand-by state until an interruption is made from the line interface 19. If an interruption from the line interface 19 is made in the step 101, the central processing unit 29 temporarily stores a signal from the line interface 19 in a register included in the central processing unit 29, in the step 103. Subsequently, the central processing unit 29 detects, in the step 105, the name of substation, the device address and the status of the device which are sent from the line interface 19 through the bus 31. In the step 107, the status is written into an area in the status memory 21 corresponding to the device. Thus, the refreshing of the status memory 21 is performed. Upon completion of refreshing of the status memory 21, the central processing unit 29 is again in a stand-by status until an interruption is made.

If an interruption from the input interface 33 is made in the step 109, the central processing unit 29 temporarily stores, in the subsequent step 111, a signal from the input interface 33 in the above described register in the central processing unit 29. At step 113, central processing unit 29 detects a substation code from a card selected by an operator, based on the contents of the register. Upon detection of the selected substation, in the following step 115, the central processing unit 29 reads out from a pattern information corresponding to the substation from a pattern memory 25 and provides the same to the output interface 35. At step 117 the central processing unit 29 further reads out the status information corresponding to the substation from the status memory 21 and provides the same to output interface 35. In the step 119, the central processing unit 29 detects an address code based on the contents of the register included in the central processing unit 29. At the same time, in the step 121, the central processing unit 29 provides to the output interface 35 a signal for displaying in a flashed manner, for example, a device specified by the operator's selection of a card on the video display 1. Thus, an operator selects a card for the purpose of specifying a device to be selectively controlled and the selected card is inserted into the card reader 5 in the console 3, so that, for example, a skeleton diagram as shown in FIG. 1 is displayed in the same manner as the FIG. 3 embodiment.

The central processing unit 29 is again in a stand-by states until an interruption is made.

If and when an operator depresses any of switches 9, 11 or 13, an interruption from the input interface 33 to the central processing unit 29 is made (step 123). Then, the central processing unit 29 sends to the line interface 19 a substation name and a device address previously loaded in the register and a control command corresponding to actuation of a switch.

A device address and a control command are sent to a corresponding substation from the line interface 19 and the selected device included in the substation performs an operation responsive to the control command in the same manner as the FIG. 3 embodiment. Accordingly, the change of the status is sent to the central processing unit 29 through the line interface 19. The central processing unit 29 executes previous steps 103, 105 and 107 and the newest pattern display that the status change has been caused is made.

Thereafter, if an operator depresses the RS witch 15, then an interruption from the input interface 33 to the central processing unit 29 is again made (step 127).

Correspondingly, the central processing unit 29 releases an output of the output interface 35 so that a display on the video display 1 is erased.

Thus, as shown in the FIG. 7 embodiment, even in a system wherein communication between the respective circuits is controlled in a generalized manner by the central processing unit 29 and communication between the respective circuits is made through the bus 31, it is possible to supervise selectively devices included in a substation by way of the same operation as the FIG. 3 embodiment.

In the above described embodiments, it has been described that the card 7 inserted into the card reader 5 is returned by an operator's actuation of the RS switch 15. In such case, as described in the foregoing, a motor (not shown) included in the card reader 5 for taking a card is reversed in response to an actuation of the RS switch 15. However, such reverse of a motor can be automatically made. For example, in the FIG. 3 embodiment, the output control 23 may detect that a corresponding device operates responsive to a control command commanded by an operator, and a reverse signal is applied to the card reader 5 through an input control 17 (or directly) from the output control 23 in response to such detection. In addition, in the FIG. 7 embodiment, it is possible that completion of the operation of the corresponding device is detected by the central processing unit. Accordingly, a reverse signal may be applied to the card reader 5 from the central processing unit 29.

In the above described embodiment, as shown in FIG. 6, a magnetic strip 71 is formed in the card 7 and a substation code and a device address code are magnetically recorded therein. However, instead of such mechanically readable recording system, an optically recording system may be utilized. In case where a code is optically recorded, transmitting portion or reflecting portion may be provided in a various arrangement according to a code.

As described in the foregoing, in accordance with the present invention, as both of a supervisory panel and a control panel, those structured by a fixed hardware may be utilized in a general-purpose manner in various kinds and size of systems. The reason is that since the present console is adapted to utilize a card for designating a device to be controlled, it is not necessary to provide an individual substation selection switch and device designating switch or a number switch such as a conventional one shown in FIG. 2. In addition, since, in order to designate a device to be selected, a card is merely selected which is prepared in advance for each device, an operation thereof is very easy as compared with a type of specifying a substation and a device by operating an alphameric key. Since key operation for designating a device is not needed, an erroneous selection is hardly made. As regards a lock for security, since a single card corresponds to a single device, the card is sealed or an operator carries the same after the operator renders the corresponding device to be an off state in accordance with the above described operations, so that the lock for security is securely made and thus it is very safe.

In addition, as the above described embodiment, since only an control switch is adapted to be of a type of manual operation, another advantage can be obtained that a requirement required as a conventional console of such kind of master station, that is, what an operation should be securely made, is given to an operator so that a sense of security is given to the operator. However, such control switch may be replaced by a numerical key such as a conventional number switch in FIG. 2, for example, so that a control code comprised of a combined numerical values is inputted. If a control code is inputted by using a combination of numerical keys instead of such control switch , a general-purpose for a console is further enhanced. For example, since a console for use in a power system is different in the control content from those for use in a control system in other chemical plant or ship, it is necessary to increase or decrease or alter control switches according to a kind of such system. To this end, if a control code is inputted by a numerical key, a variety of systems may be widely utilized by merely altering a user program.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A master station apparatus in a supervisory and control system of supervising or remotely controlling a plurality of devices to be controlled, comprising:

a card on which device specifying information for specifying any of said plurality of devices to be controlled is man-readably and machine readably recorded, card reader means for receiving said card for mechanically reading out said device specifying information recorded on the card, said card reader means including a card returning means for returning said card, and which further comprises means for providing a return command to said card returning means, said means a for providing said return command comprising a reset switch, and which further comprises means for resetting said master station apparatus to an initial state in response to a signal form said reset switch;

status memory means for storing the present status of each of said devices to be controlled, video display means, displaying means including means for reading out from said status memory means the present status of a device to be controlled specified by said device specifying information from said card reader means and for displaying the status on said video display means, control operating means for controlling the device specified by said card for generating a control command for varying the status thereof by a manual operation, and control command transmitting means for applying the control command from said control operation means to said specified device to be controlled.

2. A master station apparatus in accordance with claim 1, wherein said plurality of devices to be controlled are included in a plurality of substations, said device specifying information on said card comprises substation designating information for designating a substation including the device, and a device designating information for designating the device to be controlled included in the substation, said apparatus further comprising pattern memory means for storing, for each of said plurality of substations therein, patterns of arrangement of the devices to be controlled, and said displaying means including further means for reading out from said pattern memory means the stored pattern of arrangement of the devices of the substation designated by said substation designating information included in said device specifying information from said card reader means and for displaying the stored pattern on said video display means.

3. A master station apparatus in accordance with claim 2, which further comprises means for transmitting, together with said control command, said substation designating information and said device designating information for the designated substation including devices to which the control command is to be applied, one of said substations designated by the substation designating information controlling the specified device to be controlled based on said device designating information and said control command.

4. A master station apparatus in accordance with claim 3, wherein said substation applies to said master station apparatus an operation indicating signal indicating that the specified device to be controlled has operated in response to said control command, said master station apparatus further comprises memory refreshing means for refreshing said status memory means based on said operation indicating signal from the substation.

5. A master station apparatus in accordance with claim 1, which further comprises means providing a control signal to said video display means for displaying on said video display means a representation of the device to be controlled, specified by said card, in a manner different from a representation of other devices which are not specified.

6. A master station apparatus in accordance with claim 1, which further comprises temporal store means for temporarily storing information from said card reader means and/or a control command from said control operating means and wherein said means for resetting comprises means for providing the signal from said reset switch to said store means for resetting the store means to an initial state.

7. A master station apparatus in accordance with claim 1, which further comprises means for erasing a display on said video display means in response to return of said card by said card reader means.

8. A master station apparatus in a supervisory and control system for supervising or remotely controlling a plurality of devices to be controlled, comprising:

input control means for the apparatus responsive to information carried on an information bearing medium, for placing the master station apparatus in a control mode for a specified device, including:

a card on which device specifying information for specifying any of said plurality of devices to be controlled is man-readably and machine readably recorded, card reader means for receiving said card for mechanically reading out said device specifying information recorded on the card, said card reader means including a card returning means for returning said card, and which further comprises means for providing a return command to said card returning means, said means for providing said return command comprising a reset switch, and which further comprises means for resetting said master station apparatus to an initial state in response to a signal from said reset switch;

status memory means for storing the present status of each of said devices to be controlled, video display means, displaying means including means for reading out from aid status memory means the present status of a device to be controlled specified by said device specifying information from said card reader means and for displaying the status on said video display means, control operating means for controlling the device specified by said card for generating a control command for varying the status thereof by a manual operation, and control command transmitting means for applying the control command from said control operating means to said specified device to be controlled.

* * * * *